United States Patent
Satyanarayana et al.

(10) Patent No.: US 10,504,166 B2
(45) Date of Patent: Dec. 10, 2019

(54) METHOD AND SYSTEM FOR WEBSITE VERIFICATION

(71) Applicant: MasterCard Asia/Pacific Pte. Ltd., Singapore (SG)

(72) Inventors: Suresh Satyanarayana, Singapore (SG); David Chan, Singapore (SG)

(73) Assignee: MASTERCARD ASIA/PACIFIC PTE. LTD, Singapore (SG)

( * ) Notice: Subject to any disclaimer, the term of this patent is extended or adjusted under 35 U.S.C. 154(b) by 578 days.

(21) Appl. No.: 15/200,401

(22) Filed: Jul. 1, 2016

(65) Prior Publication Data
US 2017/0039612 A1 Feb. 9, 2017

(30) Foreign Application Priority Data
Aug. 3, 2015 (SG) .......................... 10201506058U

(51) Int. Cl.
G06Q 30/06 (2012.01)
H04L 29/06 (2006.01)
(Continued)

(52) U.S. Cl.
CPC ......... G06Q 30/0609 (2013.01); G06F 15/16 (2013.01); G06F 21/565 (2013.01);
(Continued)

(58) Field of Classification Search
CPC ............ G06Q 30/0609; G06Q 30/0185; H04L 2463/102; H04L 63/083; H04L 9/00;
(Continued)

(56) References Cited

U.S. PATENT DOCUMENTS 9,979,725 B1 * 5/2018 Liu .................... H04L 63/10
2005/0160286 A1 * 7/2005 Currie .................. G06F 21/577
726/22
(Continued)

FOREIGN PATENT DOCUMENTS

JP 2007310781 A 11/2007

OTHER PUBLICATIONS

Shariyar Hossain, "Mitigation of Web-based program security vulnerability exploitations", published as a thesis in Nov. 2011, at Queens University Kingston Ontario, Canada, extracted from Dialog on Jul. 23, 2019.*
(Continued)

*Primary Examiner* — Yogesh C Garg
(74) *Attorney, Agent, or Firm* — Buckley, Maschoff & Talwalkar, LLC

(57) ABSTRACT

A computer-implemented method is proposed for website verification. The method comprises: storing registration records for legitimate websites in a verification register; receiving, from a website to be verified, a user-initiated verification request; responsive to the user-initiated verification request, checking that the website to be verified is in the verification register; generating and transmitting a dynamic code for display on the website if the website to be verified is in the verification register; and responsive to a user entering the dynamic code into a verification module, retrieving details of the website from the verification register and transmitting the details of the website to the user for checking against the website to be verified.

20 Claims, 5 Drawing Sheets

(51) Int. Cl.
*G06Q 30/00* (2012.01)
*G06K 5/00* (2006.01)
*G06F 21/56* (2013.01)
*G06F 15/16* (2006.01)
*H04L 9/00* (2006.01)

(52) U.S. Cl.
CPC ........... *G06K 5/00* (2013.01); *G06Q 30/0185* (2013.01); *H04L 9/00* (2013.01); *H04L 63/083* (2013.01); *H04L 63/1483* (2013.01); *H04L 2463/102* (2013.01)

(58) Field of Classification Search
CPC ... H04L 63/1483; G06F 15/16; G06F 21/565; G06K 5/00
USPC .......... 705/26.35; 713/68; 709/206; 235/375
See application file for complete search history.

(56) References Cited

U.S. PATENT DOCUMENTS

| | | | | |
|---|---|---|---|---|
| 2007/0143845 A1* | 6/2007 | Jeong | .................... | G06F 21/577 726/22 |
| 2007/0250920 A1* | 10/2007 | Lindsay | .................. | G06F 21/31 726/7 |
| 2009/0271868 A1 | 10/2009 | Ogawa | | |
| 2011/0082768 A1* | 4/2011 | Eisen | ................. | G06Q 30/0609 705/26.35 |
| 2012/0210408 A1* | 8/2012 | Lu | ....................... | H04L 63/0846 726/6 |
| 2013/0007859 A1 | 1/2013 | Bravo et al. | | |
| 2014/0263615 A1* | 9/2014 | Deangelo | ............... | G07D 7/004 235/375 |
| 2015/0012382 A1* | 1/2015 | Ceribelli | ................ | G06Q 50/01 705/26.35 |
| 2015/0302421 A1* | 10/2015 | Caton | .................. | G06Q 30/018 705/17 |

OTHER PUBLICATIONS

2011-C14232, Mar. 2011, Derwent, Adelman et al.*
"PCT Notification of Transmittal of the International Search Report and the Written Opinion" International Searching Authority, dated Nov. 10, 2016 (dated Oct. 10, 2016), for International Application No. PCT/SG2016/050332, 7pgs.

* cited by examiner

METHOD AND SYSTEM FOR WEBSITE VERIFICATION

CROSS-REFERENCE TO RELATED APPLICATION

This application is a U.S. National Stage filing under 35 U.S.C. § 119, based on and claiming benefit of and priority to SG 10201506058U filed Aug. 3, 2015.

FIELD OF THE INVENTION

The present invention relates to a method and system for website verification. The websites to be verified may belong to merchants, government departments, associations, educational institutions or any other entity with a legitimate online presence.

BACKGROUND

Many online shoppers shy away from transacting through websites of lesser known online merchants due to fear of payment card data compromise on illegitimate merchant websites. Many more courageous cardholders unknowingly transact on illegitimate merchant websites and their payment cards are subsequently used fraudulently. As a result, a high percentage of cardholders do not shop online or, if they do, they use alternative payment methods such as bank transfers or PayPal™. There is therefore a need for a website verification system so that cardholders can check and verify that a website is legitimate before entering their payment card details.

More generally, a website verification system could be used so that internet users can check that other (e.g. non-merchant) websites are legitimate before trusting the information provided on them.

It is therefore an aim of the present invention to provide a method and system for website verification that helps to ameliorate the afore-mentioned problems.

SUMMARY OF THE INVENTION

In accordance with a first aspect of the invention there is provided a computer-implemented method for website verification comprising:
(i) storing registration records for legitimate websites in a verification register;
(ii) receiving, from a website to be verified, a user-initiated verification request;
(iii) responsive to the user-initiated verification request, checking that the website to be verified is in the verification register;
(iv) generating and transmitting a dynamic code for display on the website if the website to be verified is in the verification register; and
(v) responsive to a user entering the dynamic code into a verification module, retrieving details of the website from the verification register and transmitting the details of the website to the user for checking against the website to be verified.

Embodiments of the present invention have the advantage that any online entity can verify itself to internet users, without the users themselves requiring to register with the website.

Embodiments of the invention may be particularly suited for the verification of merchant websites prior to a user entering payment card details to perform an online transaction.

A server may be configured to carry out one, more than one or all of the methods steps (i) to (v).

After registration, the website may be issued with a unique registration code that is stored in the register.

The step of storing registration records for legitimate websites in a verification register may comprise obtaining details of legitimate websites from a trusted server. The trusted server may be operated by an Acquirer (i.e. a financial institution hosting an account for the legitimate website). The trusted server may be responsible for vetting the websites prior to their registration. The trusted server may also be responsible for transmitting the unique registration code to the website, after it has been issued by the verification register.

A verification engine may be provided to implement one or more of the above steps. The verification engine may be configured to receive a registration code from a website and to check that the registration code matches the website in the verification register before generating and transmitting the dynamic code for display on the website. The verification engine may also transmit details of the website, obtained from the verification register, for display on the website.

The step of generating the dynamic code may comprise use of the website's registration code. In some embodiments, the step of generating the dynamic code may further comprise use of a trusted server/acquirer code.

The user may visually check the details transmitted against the website being verified.

The verification module may comprise, or be part of, a web application and/or mobile application (e.g. for use via a smartphone or tablet computer).

The verification module may communicate with the verification engine to retrieve and display details of the website from the register.

The details of the website that are stored in the register and/or presented to the user for verification purposes may comprise one or more of the following non-limiting examples: website address (e.g. URL); IP address or IP address range; business/organisation name and/or contact details; logo; company number; tax registration number.

The method may further comprise receiving user-provided content (e.g. alphanumeric string, photograph, image, emoticon, video, sound bite etc.), which a user may enter into the verification module, and transmitting the user provided content for display on the website. Advantageously, displaying the user-provided content on the website provides additional assurance to the user that the website is genuine, since the user-provided content is transmitted via a trusted third party (the verification module) and not provided directly to the website itself.

The step of transmitting the user-provided content for display on the website may comprise the verification module submitting the user-provided content to the verification engine; and the website retrieving the user-provided content from the verification engine. The user may select an option on the website to display the user-provided content or the content could be displayed when the website is refreshed.

In accordance with a second aspect of the invention there is provided a computer system for website verification comprising:
a database comprising a verification register storing registration records for legitimate websites; and
a verification engine configured to:
(i) receive verification instructions from a website when a user selects to verify the website;

(ii) check that the website is in the verification register;
(iii) generate and transmit a dynamic code for display on the website;
(iv) receive a dynamic code entered by a user through a verification module; and
(v) retrieve and transmit details of the website obtained from the database, to the user via the verification module to enable checking of the details with the website being verified.

The database may further comprise registration codes for each website in the verification register.

The verification engine may communicate with one or more of the website, the verification register, and the verification module over a secure communication channel.

Embodiments of the invention may be implemented in the form of a centralised computer system (e.g. a server) which presents an interface to which operators may connect (e.g. over the internet). Alternatively, it may be provided as an application ("app") running on an operator-owned computing device, optionally communicating with external database(s).

The optional method features described above may be implemented using the computer system according to the second aspect of the invention.

In accordance with a third aspect of the invention there is provided a non-transitory computer-readable medium having stored thereon program instructions for causing at least one processor to perform the method according to the first aspect of the invention.

In accordance with a fourth aspect of the invention there is provided a verification module for verifying that a website is registered as a legitimate website in a verification register comprising:
an input field for a user to enter a dynamic code displayed on a website after a website verification option is selected;
a communication module for relaying the dynamic code to a verification engine and receiving in return details of an associated website retrieved from the register; and
an output field for display of details of the website retrieved from the register, for checking against the website being verified.

The module may further comprise an interface for a user to enter user-provided content into the verification module for display on the website being verified.

In accordance with a fourth aspect of the invention there is provided code for a website registered in a verification register comprising:
a communication module for obtaining a dynamic code from a verification engine configured to check that the website is in the verification register, when a verification option is selected by a user; and
a display module for presenting the dynamic code to the user for use in a verification module.

BRIEF DESCRIPTION OF THE DRAWINGS

Embodiments of the invention will now be described, by way of example only, with reference to the following drawings, in which.

DETAILED DESCRIPTION OF CERTAIN EMBODIMENTS

Figure 1:
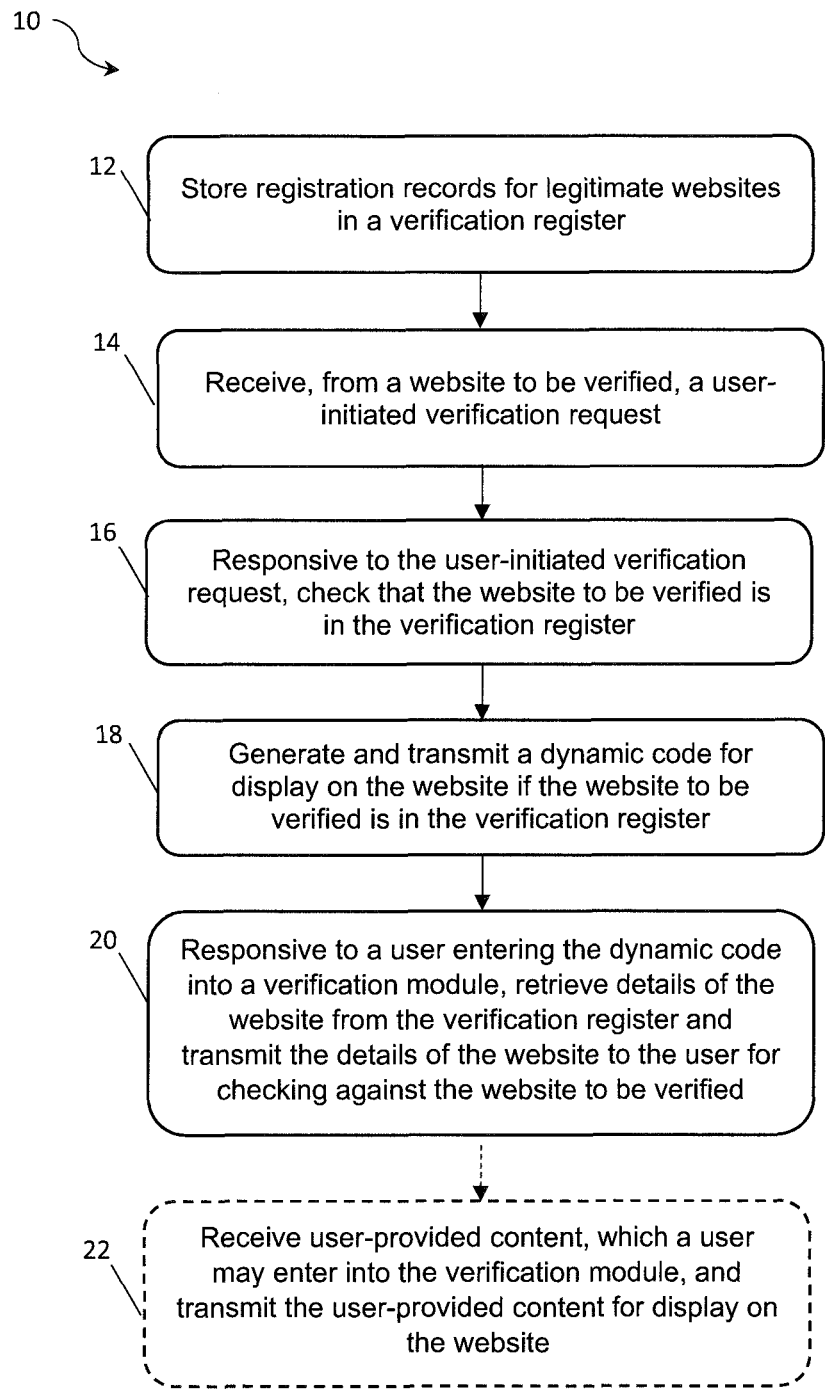
FIG. 1 is a flowchart of a method according to an embodiment of the present invention.

In accordance with an embodiment of the present invention there is provided a method 10 of website verification as illustrated in FIG. 1. In particular, the method comprises the following steps:

Step 12: storing registration records for legitimate websites in a verification register;

Step 14: receiving, from a website to be verified, a user-initiated verification request;

Step 16: responsive to the user-initiated verification request, checking that the website to be verified is in the verification register;

Step 18: generating and transmitting a dynamic code for display on the website if the website to be verified is in the verification register;

Step 20: responsive to a user entering the dynamic code into a verification module, retrieving details of the website from the verification register and transmitting the details of the website to the user for checking against the website to be verified.

Optionally, there is further step 22 of receiving user-provided content (e.g. alphanumeric string, photograph, image, emoticon, video, sound bite etc.), which a user may enter into the verification module, and transmitting the user-provided content for display on the website.

Figure 2:
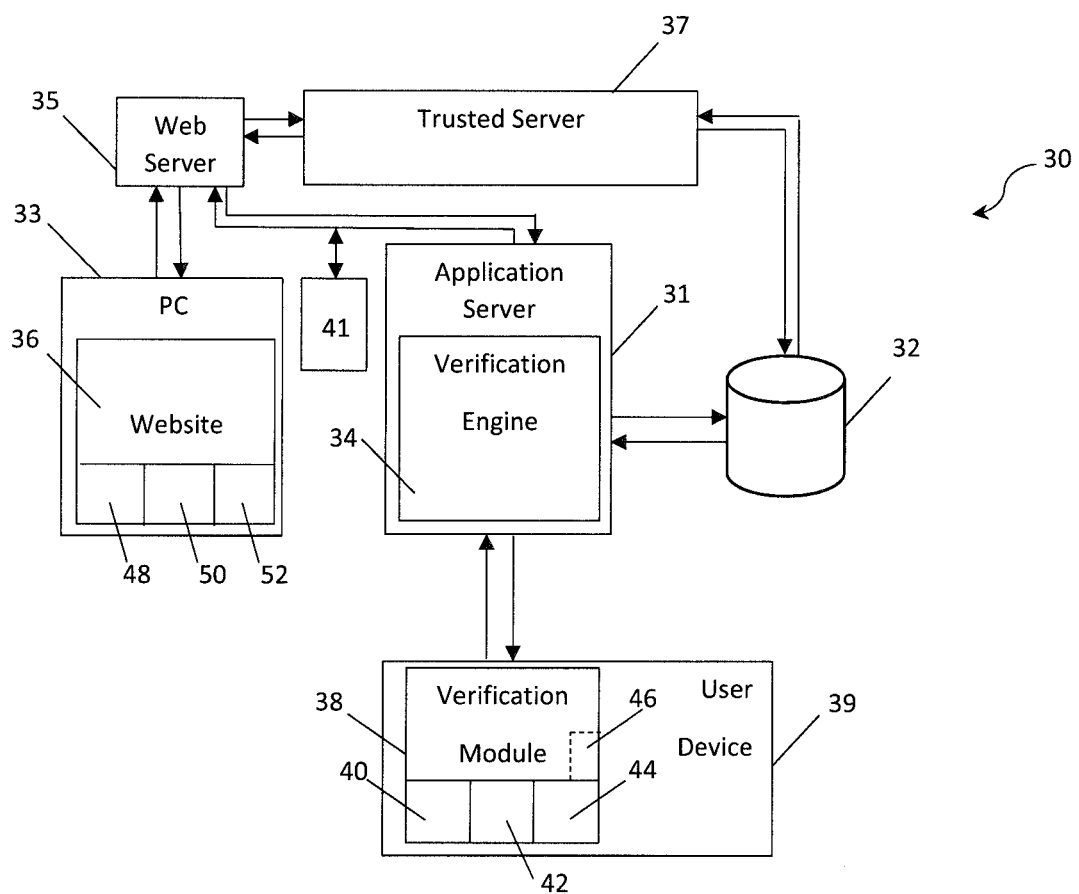
FIG. 2 is a block diagram of a computer system according to an embodiment of the present invention.

FIG. 2 shows a block diagram of a computer system 30 according to an embodiment of the present invention. The computer system 30 is configured for website verification in accordance with the method described above and comprises a database 32 containing the verification register comprising information on legitimate websites and their registration codes; and a verification engine 34 running on an application server 31.

The verification engine 34 is configured to: receive verification instructions from a website 36 which is running on a personal computer (PC) 33 (via a web server 35) when a user selects to verify the website; check that the website 36 is on the verification register; generate and relay a dynamic code back to the website 36 for presentation to the user; receive a dynamic code entered by a user through a verification module 38 which is running on a user device 39; and relay details of the website obtained from the database 32, to the user via the verification module 38 to enable checking of the details with the website 36 being verified.

The verification module 38 is configured for verifying that the website 36 is registered as a legitimate website on the verification register 32. The verification module 38 comprises: an input field 40 for a user to enter a dynamic code displayed on the website 36 after a website verification option is selected; a communication module 42 for relaying the dynamic code to the verification engine 34 and receiving in return details of an associated website received from the register 32; and an output field 44 for display of details of the website received from the register 32, for checking against the website 36 being verified.

In some embodiments, the module 38 may comprise an interface 46 for a user to enter user-provided content into the verification module 38 for display on the website 36 being verified.

In the above example, the website 36 is already registered on the verification register 32 via a trusted server 37. Further details of the registration procedure are described below in relation to FIG. 5. In addition, the website 36 comprises: a control element 48 which can be operated by a user to send a verification request to the verification engine 34; a communication module 50 for obtaining a dynamic code from the verification engine 34 after it has checked that the website 36 is on the verification register 32; and a display module 52 for presenting the dynamic code to the user for use in the verification module 38.

Although not shown, the computer system 30 may further comprise a user interface UI for presenting verification information to an operator, e.g. through the PC 33 or mobile device 39. Furthermore, the computer system 30 may comprise a distributed system with one or more components (e.g. servers) distributed over a network (i.e. the internet). In some embodiments, the PC 33 may be substituted by a tablet computer or smartphone. Furthermore, the user device 39 may take the form of a, PC, tablet computer or smartphone, which may be the same device or a different device to that showing the website 36 to be verified.

Although the application server 31, web server 35 and trusted server 37 are each shown separately in FIG. 2, a single server may take the place of two or more of these separate servers to perform their functions.

Figure 3:
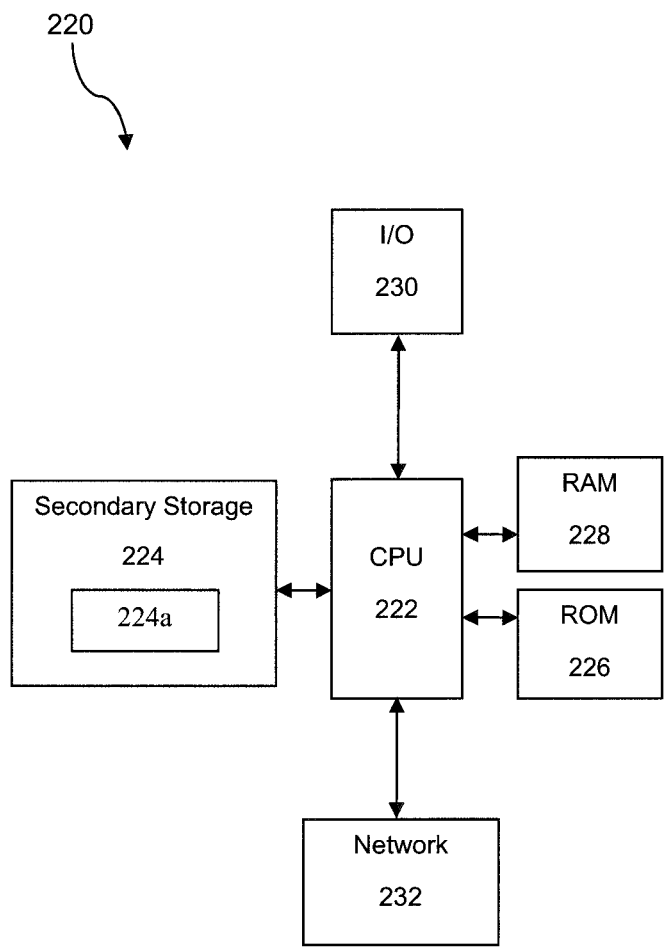
FIG. 3 is a block diagram illustrating a technical architecture of a server of FIG. 2.

FIG. 3 is a block diagram showing a technical architecture of each of the servers 31, 35 and 37 configured for performing the method 10 which is described above with reference to FIG. 1. Typically, the method 10 is implemented by a computer server having a data-processing unit. The block diagram as shown FIG. 3 illustrates a technical architecture 220 of a server which is suitable for implementing one or more embodiments herein.

The technical architecture 220 includes a processor 222 (which may be referred to as a central processor unit or CPU) that is in communication with memory devices including secondary storage 224 (such as disk drives), read only memory (ROM) 226, and random access memory (RAM) 228. The processor 222 may be implemented as one or more CPU chips. The technical architecture 220 may further comprise input/output (I/O) devices 230, and network connectivity devices 232.

The secondary storage 224 is typically comprised of one or more disk drives or tape drives and is used for non-volatile storage of data and as an over-flow data storage device if RAM 228 is not large enough to hold all working data. Secondary storage 224 may be used to store programs which are loaded into RAM 228 when such programs are selected for execution.

In this embodiment, the secondary storage 224 has a component 224a comprising non-transitory instructions operative by the processor 222 to perform various operations of the method of the present disclosure. The ROM 226 is used to store instructions and perhaps data which are read during program execution. The secondary storage 224, the RAM 228, and/or the ROM 226 may be referred to in some contexts as computer readable storage media and/or non-transitory computer readable media.

I/O devices 230 may include printers, video monitors, liquid crystal displays (LCDs), plasma displays, touch screen displays, keyboards, keypads, switches, dials, mice, track balls, voice recognizers, card readers, paper tape readers, or other well-known input devices.

The network connectivity devices 232 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 232 may enable the processor 222 to communicate with the Internet or one or more intranets. With such a network connection, it is contemplated that the processor 222 might receive information from the network, or might output information to the network in the course of performing the above-described method operations. Such information, which is often represented as a sequence of instructions to be executed using processor 222, may be received from and outputted to the network, for example, in the form of a computer data signal embodied in a carrier wave.

The processor 222 executes instructions, codes, computer programs, scripts which it accesses from hard disk, floppy disk, optical disk (these various disk based systems may all be considered secondary storage 224), flash drive, ROM 226, RAM 228, or the network connectivity devices 232. While only one processor 222 is shown, multiple processors may be present. Thus, while instructions may be discussed as executed by a processor, the instructions may be executed simultaneously, serially, or otherwise executed by one or multiple processors.

Although the technical architecture 220 is described with reference to a computer, it should be appreciated that the technical architecture may be formed by two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the technical architecture 220 to provide the functionality of a number of servers that is not directly bound to the number of computers in the technical architecture 220. In an embodiment, the functionality disclosed above may be provided by executing the application and/or applications in a cloud computing environment. Cloud computing may comprise providing computing services via a network connection using dynamically scalable computing resources. A cloud computing environment may be established by an enterprise and/or may be hired on an as-needed basis from a third party provider.

It should be understood that by programming and/or loading executable instructions onto the technical architecture 220, at least one of the CPU 222, the RAM 228, and the ROM 226 are changed, transforming the technical architecture 220 in part into a specific purpose machine or apparatus having the novel functionality taught by the present disclosure. It is fundamental to the electrical engineering and software engineering arts that functionality that can be implemented by loading executable software into a computer can be converted to a hardware implementation by well-known design rules.

FIGS. 1-3 explain the invention in terms of the method 10 being performed by a server. However, alternatively the method may be performed by the PC 33 or user device 39, having downloaded appropriate software from the server 31.

The PC 33 or user device 39 may communicate with the server 31 to obtain data which is required, such as from the database 32.

Figure 4:
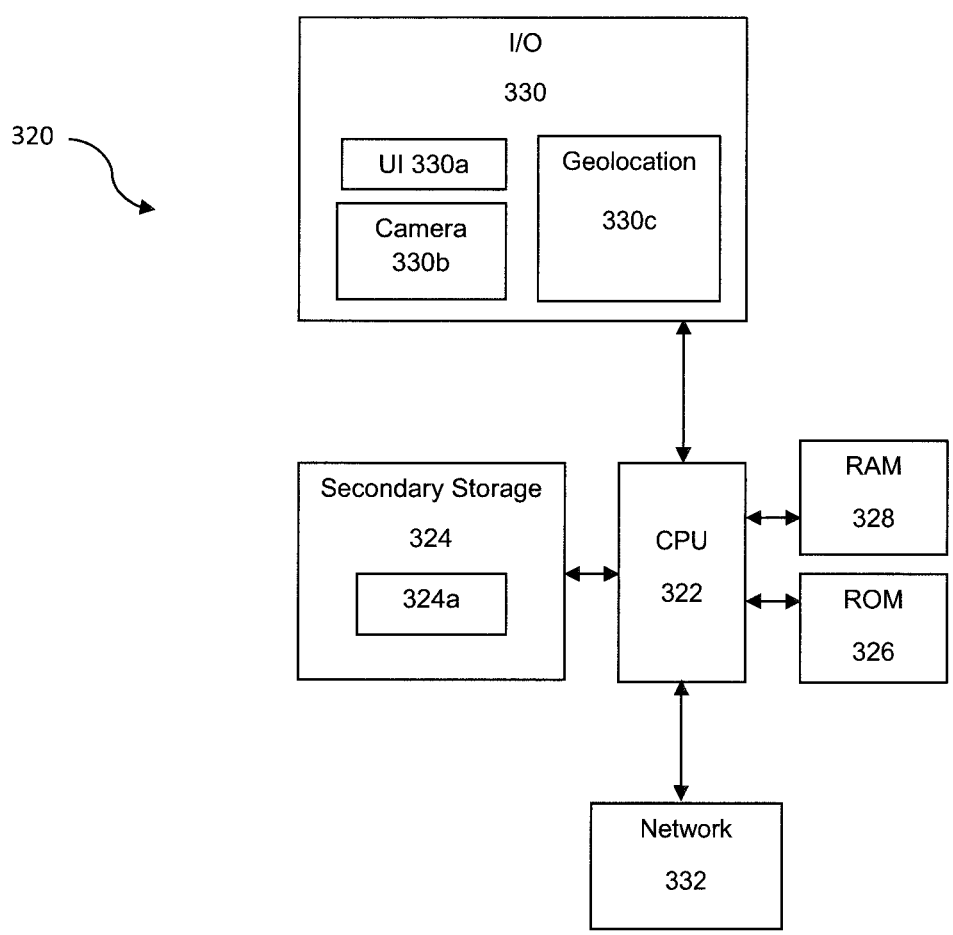
FIG. 4 is a block diagram illustrating a technical architecture of a user device which may be employed in the implementation of embodiments of the invention.

FIG. 4 is a block diagram showing a technical architecture of the PC 33 or user device 39. It is envisaged that in embodiments, the user device 39 will be a smartphone or tablet device. The block diagram as shown FIG. 4 illustrates a technical architecture 320 of a PC 33 or user device 39 which is suitable for implementing one or more embodiments herein.

The technical architecture 320 includes a processor 322 (which may be referred to as a central processor unit or CPU) that is in communication with memory devices including secondary storage 324 (such as disk drives or memory cards), read only memory (ROM) 326, and random access memory (RAM) 328. The processor 322 may be implemented as one or more CPU chips. The technical architecture 320 further comprises input/output (I/O) devices 330, and network connectivity devices 332.

The I/O devices comprise a user interface (UI) 330a, a camera 330b and a geolocation module 330c. The UI 330a may comprise a touch screen, keyboard, keypad or other known input device. The camera 330b allows a user to capture images and save the captured images in electronic form. The geolocation module 330c is operable to determine the geolocation of the PC 33 or user device 39 using signals from, for example global positioning system (GPS) satellites.

The secondary storage 324 is typically comprised of a memory card or other storage device and is used for non-volatile storage of data and as an over-flow data storage device if RAM 328 is not large enough to hold all working data. Secondary storage 324 may be used to store programs which are loaded into RAM 328 when such programs are selected for execution.

In this embodiment, the secondary storage 324 has a component 324a, comprising non-transitory instructions operative by the processor 322 to perform various operations of the method of the present disclosure. The ROM 326 is used to store instructions and perhaps data which are read during program execution. The secondary storage 324, the RAM 328, and/or the ROM 326 may be referred to in some contexts as computer readable storage media and/or non-transitory computer readable media.

The network connectivity devices 332 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 332 may enable the processor 322 to communicate with the Internet or one or more intranets. With such a network connection, it is contemplated that the processor 322 might receive information from the network, or might output information to the network in the course of performing the above-described method operations. Such information, which is often represented as a sequence of instructions to be executed using processor 322, may be received from and outputted to the network, for example, in the form of a computer data signal embodied in a carrier wave.

The processor 322 executes instructions, codes, computer programs, scripts which it accesses from hard disk, floppy disk, optical disk (these various disk based systems may all be considered secondary storage 324), flash drive, ROM 326, RAM 328, or the network connectivity devices 332. While only one processor 322 is shown, multiple processors may be present. Thus, while instructions may be discussed as executed by a processor, the instructions may be executed simultaneously, serially, or otherwise executed by one or multiple processors.

In embodiments of the invention, the server 31 may generate HTML or XML code which a browser of the PC 33 or user device 39 can use to generate a window presenting data on a screen of the PC 33 or user device 39.

Figure 5:
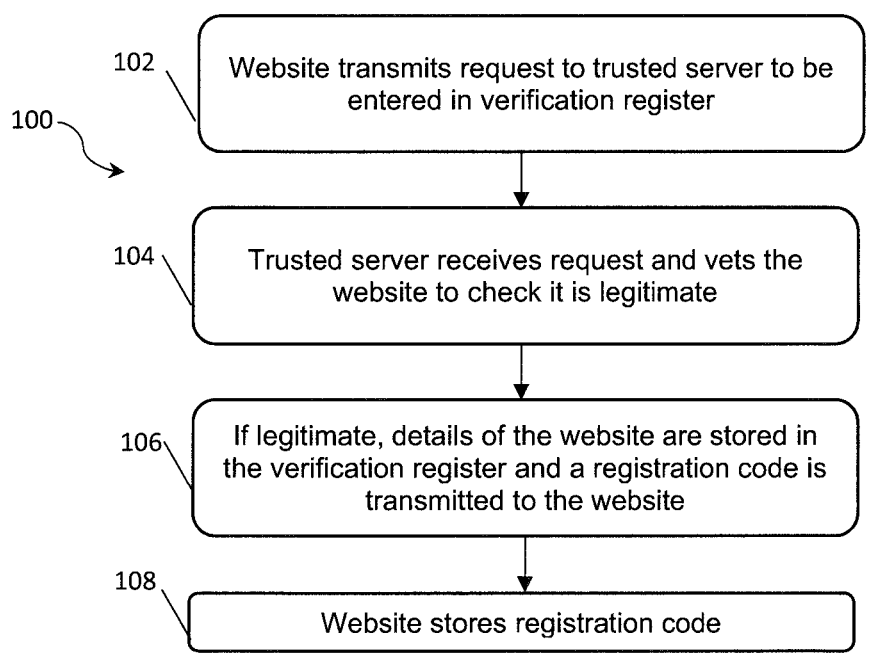
FIG. 5 is a flowchart of a website registration procedure in accordance with an embodiment of the present invention.

Returning to an exemplary method of implementing the invention, FIG. 5 shows a flowchart of a registration procedure 100 in accordance with an embodiment of the invention. The registration procedure 100 comprises the following steps:

Step 102: the website 36 (via web server 35) transmits a request to register their details (e.g. URL, IP address/address range, business/organisation name and/or contact details, logo, company number, tax registration number) in the verification register 32, through the trusted server 37. This could be performed in a number of ways (e.g. via an electronic form or manual data entry).

Step 104: the trusted server 37 receives the request from the web server 35 and vets the website 36 to check it is legitimate. For example, the trusted server 37 may receive electronic input (e.g. from a document which is readable via OCR or via a web interface). Alternatively, the trusted server 37 may receive manual input by an operator entering details through a user interface UI. Once the details are entered into the trusted server 37 they may be processed automatically to check for errors and/or missing data. The vetting may comprise the trusted server 37 checking the website's details on a further database. For example, the trusted server 37 may check the details provided against details available on a company register.

Step 106: If the website 36 is deemed to be legitimate (e.g. because the trusted server 37 has found corresponding details on a company register), details of the website 36 are stored in the verification register (i.e. database 32) and a unique registration code is transmitted to the website 36.

Step 108: The website 36 then stores the registration code securely. This may be done by entering the registration code into an encrypted database 41 in communication with the web server 35 or application server 31. As mentioned above, a single server could provide the functions of two or more of the servers 31, 35, 37 detailed above. However, in the embodiment shown in FIG. 2, the web server 35 is primarily configured to serve website pages to the PC 33 and the application server 31 is configured to communicate with the web server 35 to perform the verification functions described in relation to FIG. 1.

In use, the web server 35 serves a website page to a browser of the PC 33. The page includes a control element 48 which can be interacted with by the user (e.g. by clicking, tapping or pressing via a user interface) in order to generate a verification request message. The verification request message is forwarded by the browser of the PC 33 to the web server 35 and onto the application server 31. The web server 35 also retrieves the stored registration code from the encrypted database 41 and relays it with the verification request to the verification engine 34, for example using a secure transmission method such as SSL/TLS. Responsive to the verification request, the verification engine 34 queries the verification register in database 32 using the transmitted registration code to check whether the website 36 is in the verification register. If the registration code is found in the verification register, the verification engine will generate a dynamic code by inputting the registration code into a pre-defined algorithm. The application server 31 then transmits the dynamic code back via the web server 35 which instructs the PC's browser to display the dynamic code to the user.

Optionally, details of the website, as obtained from the register, may also be transmitted to the user via the browser for further verification. If the registration code is not found in the verification register, the verification engine will transmit a message to this effect for display to the user via the PC's browser.

In accordance with step 20 of FIG. 1, the user will enter the dynamic code into the verification module 38, which may take the form of a website or application "app" running on the user device 39. The communication module 42 in the user device 39 will transmit the entered code to the application server 31 and the verification engine 34 will check that the entered code matches the dynamic code transmitted to the web server 35 (i.e. by performing a reverse algorithm to extract the website's registration code from the dynamic code). The verification engine 34 will then retrieve details of the website associated with the dynamic code (or registration code), from the verification register and transmit these to the verification module, the communication module 42, for display via the output field 44 on the user's device 39.

As per step 20, the user can then visually check that the information about the website (obtained from the register and provided through the verification module) matches that of the website concerned to verify its legitimacy.

The verification module may be, or be part of, a web application or mobile application executing on the user's device 39. As shown in FIG. 2, the verification module 38 may provide a field 40 for the user to enter the dynamic code generated by the verification engine and displayed on the website. Optional step 22 in FIG. 1 may comprise the user entering user-provided content into the verification module via the interface 46. This is then submitted to the verification engine by the communication module 42. The user may then select an option on the website 36, via a control element 48 to display their user-provided content on the PC 33. The communication module 50 will relay this request to the verification engine via the web server 35. On receipt of the request to display user-provided content the verification engine will locate the user-provided content associated with the website concerned and will transmit it via the web server 35 for display on the PC 33 via the display module 52.

In order for the verification engine to locate the user-provided content associated with the website concerned, the application server 31 needs to be able to identify the user so that the correct content can be caused to be displayed on the website. One way to do this would be for the verification engine to log the user's IP address for the PC 33 (e.g. on receipt of the verification request) and to associate this with the user's IP address for the user device 39 using the dynamic code when it is correctly received by the verification engine after being input into the verification module by the user.

Alternatively this could be achieved by using session ID's. A first session ID could be associated with the connection between the user's PC web browser and the web server 35. When the user browses the web page, the web server 35 generates and stores a first session ID which is associated with the user's PC browser. The first session ID can also be stored, for example in a cookie, on the user's PC. The first session ID can also be transmitted by the web server 35 to the verification engine 34, for example, when the user selects the option to display their user-provided content on the website.

When the user uploads their content to the verification engine, the verification module can obtain a second session ID from the user device (for example by analyzing a cookie associated with the verification module) and transmit it with the content. That way, the verification engine can correctly assign the content received with the second session ID to the first session ID associated with the website being verified, such that the content can be retrieved by the web server and (for example) embedded in a page which is served to the user on the PC.

Each session ID can be associated with a control element, such as a button or other displayed element, such that when the user interacts with the control element, it forces a browser refresh which in turn causes the web server to retrieve, embed and serve the content as part of a page displayed in the browser. In this way, session ID's may be used to retrieve the user-provided content each time a control element on the website is activated by the user (thus, the content is pulled from the server to the website when initiated by the user).

Step 22 therefore provides a further level of verification that the website is registered on the verification register and can be trusted by the user.

As explained above, embodiments of the present invention may be particularly useful in verifying merchant websites prior to a user entering payment card details.

As used in this document, the term "payment card" refers to any suitable cashless payment device, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, transponder devices, NFC-enabled devices, and/or computers. In addition, the term may encompass an online wallet system (such as the applicant's MasterPass™ system), in which, rather than a cardholder entering card data, he/she gives the merchant website sufficient information to extract the card data from a database (e.g. operated by the card issuer, or by a card operator) where this data is stored.

Although only a single system and method according to embodiments of the present invention have been described in detail, many variations are possible in accordance with the appended claims. For example, additional information may be stored in the verification register for checking by a website user.

The invention claimed is:

1. A computer-implemented method for web site verification wherein a server is configured to carry out method steps comprising:
(i) storing registration records for legitimate websites in a verification register;
(ii) receiving, from a website to be verified, a user-initiated verification request;
(iii) responsive to the user-initiated verification request, checking that the web site to be verified is in the verification register;
(iv) generating and transmitting a dynamic code for display on the website if the website to be verified is in the verification register; and (i) responsive to a user entering the dynamic code into a verification module, retrieving details of the website from the verification register and transmitting the details of the website to the user for checking against the website to be verified.

2. The method according to claim 1, wherein the website is a merchant website and the user-initiated verification request is operable by the user prior to the user entering payment card details to perform an online transaction.

3. The method according to claim 1, wherein, after registration, the website is issued with a unique registration code.

4. The method according to claim 3, wherein the step of generating the dynamic code comprises use of the website's registration code.

5. The method according to claim 3, wherein the step of generating the dynamic code comprises use of an acquirer code.

6. The method according to claim 1, wherein the step of storing registration records for legitimate websites in a verification register may comprise obtaining details of legitimate web sites from a trusted server.

7. The method according to claim 6, wherein the trusted server is operated by an Acquirer, responsible for vetting the websites prior to their registration.

8. The method according to claim 6, when dependent on claim 3, wherein the trusted server is responsible for providing the unique registration code to the website, after it has been issued by the verification register.

9. The method according to claim 1, wherein a verification engine is provided to implement one or more of the method steps.

10. The method according to claim 9, wherein the verification engine is configured to receive a registration code from a website and to check that the registration code matches the web site in the verification register before generating and transmitting the dynamic code for display on the website.

11. The method according to claim 9, wherein the verification engine is configured to transmit details of the website, obtained from the verification register, for display on the website.

12. The method according to claim 9, wherein the verification module communicates with the verification engine to retrieve and display details of the website from the register.

13. The method according to claim 1, wherein the verification module comprises, or is a part of, a web application and/or mobile application.

14. The method according to claim 1, wherein the details of the website that are stored on the register and/or presented to the user for verification purposes comprise one or more of the following: website address; IP address or IP address range; business/organisation name and/or contact details; logo; company number; tax registration number.

15. The method according to claim 1, further comprising receiving user-provided content and transmitting the user provided content for display on the website.

16. The method according to claim 15, wherein the step of transmitting the user-provided content for display on the website comprises operating a verification module to submit the user-provided content to a verification engine; and the website retrieving the user-provided content from the verification engine.

17. A computer system for website verification comprising:
a database comprising a verification register storing registration records for legitimate websites; and
a verification engine configured to:
(i) receive verification instructions from a website when a user selects to verify the web site;
(ii) check that the website is in the verification register;
(iii) generate and transmit a dynamic code for display on the website;
(iv) receive a dynamic code entered by a user through a verification module; and
(v) retrieve and transmit details of the website obtained from the database, to the user via the verification module to enable checking of the details with the website being verified.

18. The system according to claim 17, wherein the database further comprises registration codes for each website in the verification register.

19. The system according to claim 17, wherein the verification engine communicates with one or more of the website, the verification register, and the verification module over a secure communication channel.

20. A non-transitory computer-readable medium having stored thereon program instructions for causing at least one processor to perform a computer-implemented method for website verification wherein a server is configured to:
store registration records for legitimate websites in a verification register;
receive, from a website to be verified, a user-initiated verification request
responsive to the user-initiated verification request, check that the website to be verified is in the verification register;
generate and transmit a dynamic code for display on the website if the website to be verified is in the verification register; and
responsive to a user entering the dynamic code into a verification module, retrieve details of the website from the verification register and transmit the details of the website to the user for checking against the website to be verified.

* * * * *